Oct. 25, 1966     L. SHERE ETAL     3,281,364
CRYSTALLINE PRODUCTS AND METHODS OF PRODUCING SAME
Filed Jan. 10, 1964
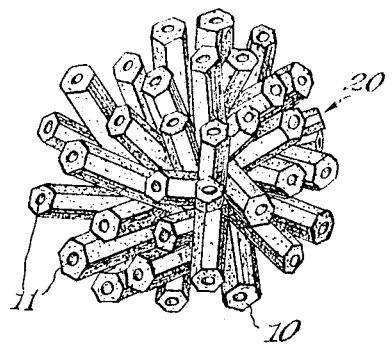
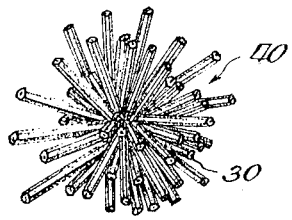
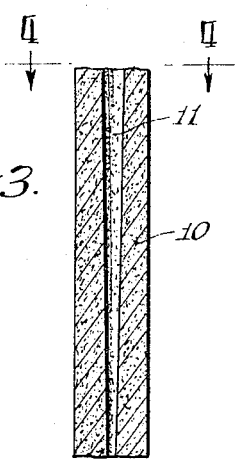
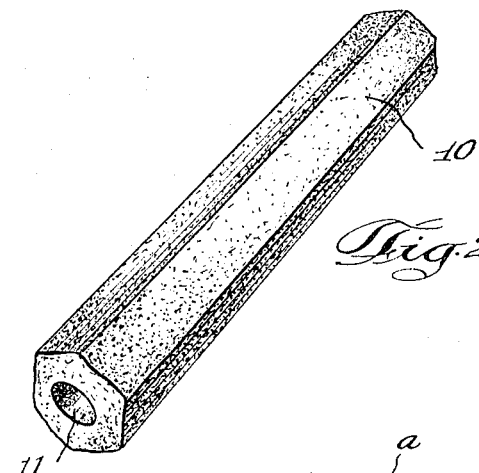
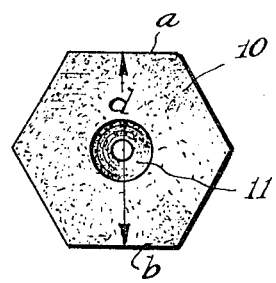
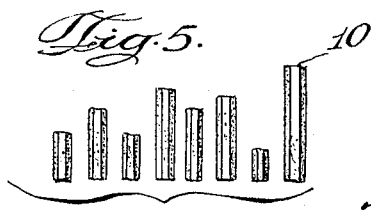
Inventors
Lewis Shere
Reinaldo T. Carrera
By
Attorneys

United States Patent Office 3,281,364
Patented Oct. 25, 1966

3,281,364
CRYSTALLINE PRODUCTS AND METHODS OF
PRODUCING SAME
Lewis Shere and Reinaldo T. Carrera, Chicago, Ill., assignors to The Diversey Corporation, Chicago, Ill., a corporation of Illinois
Filed Jan. 10, 1964, Ser. No. 337,054
30 Claims. (Cl. 252—99)

This application is a continuation-in-part of our pending U.S. applications Serial Nos. 52,956, filed August 30, 1960, 73,417, filed December 2, 1960, and 151,318, filed November 9, 1961, all of which have been abandoned, and consolidates the subject matter thereof.

This invention relates to (a) new, stable, water-soluble, hydrated crystalline products comprising crystals of hexagonal cross section having hydrated trisodium phosphate or hydrated chlorinated trisodium phosphate and a minor crystal growth modifying amount of water-soluble organic crystal growth modifier from the group consisting of sodium dodecyl benzene sulfonate, sodium lauryl sulfate, sodium N-methyl oleoyltaurate, and admixtures thereof within the crystalline structure of said crystals, and (b) methods of producing these new crystalline products.

Sodium dodecyl benzene sulfonate, sodium lauryl sulfate, sodium N-methyl oleoyltaurate, and admixtures thereof, are crystal growth modifiers (sometimes hereinafter referred to as "crystal growth modifier(s)" or "modifier(s)") in that they modify the rate of growth of the hexagonal crystals of our products, or the size and shape of the hexagonal crystals of our products, or modify hydrated trisodium phosphate or hydrated chlorinated trisodium phosphate by being present within the crystal structure thereof, or provide more than one of such modifications.

Sodium N-methyl oleoyltaurate is available commercially as Igepon T-33 (e.g., 32–34% sodium N-methyl oleoyltaurate, 7–8% sodium chloride, remainder being water) and Druterge TG concentrate (e.g., substantially corresponds with Igepon T-33).

Trisodium phosphate is commonly used as a detergent builder in washing compositions and as a water softening agent in the treatment of boiler feed water, and may be prepared by the methods referred to and disclosed in U.S. Patent 2,050,249.

Chlorinated trisodium phosphate containing about 1/4–5% by weight available chlorine is used extensively for cleaning and disinfecting dairy equipment and other food dispensing or processing equipment. This product may be produced by combining trisodium phosphate in its normal $Na_3PO_4 \cdot 12H_2O\frac{1}{7}NaOH$ to $$Na_3PO_4 \cdot 12H_2O\frac{1}{4}NaOH$$ 

form and an alkali metal hypochlorite (e.g., sodium hypochlorite) in accordance with the procedures set forth in U.S. Patents 2,324,302, 1,555,474, 1,965,304, and the like. For example, as pointed out in U.S. Patent 1,965,-304, chlorinated trisodium phosphate may be prepared by melting together partially anhydrous disodium phosphate and a caustic soda solution. These materials are melted together by means of a steam coil. Water is then added to adjust the Baumé gravity strength to 56.5° Bé. at 105° C. This mixture is then transferred to a crystallizing tub, and a strong sodium hypochlorite solution having 15% available chlorine is rapidly added to the mixture of molten phosphate. The mixture is rapidly agitated until crystallization occurs and the mass is thoroughly disintegrated. The resulting product is a moist, solid crystalline material requiring very little further drying. If the addition of an alkali metal permanganate is desired in order to color the material pink, it may be added to the molten mixture in the manner shown in U.S. Patent 2,324,302; that patent discloses the use of an alkali metal permanganate in an amount up to about 8% of the chlorinated trisodium phosphate.

We have discovered that our crystal growth modifiers may be included within either discrete hydrated trisodium phosphate crystals or discrete hydrated chlorinated trisodium phosphate crystals to produce either new, stable, water-soluble, thin needle-shaped, hydrated crystalline products or new, stable, water-soluble, large rod-shaped, hydrated crystalline products having an elongated tubular passageway.

The crystal modifier is present in a crystal growth modifying amount within the crystalline structure of the crystals, and the crystalline products have a hexagonal cross section, are substantially homogeneous in character, are stable and dissolve in water within a shorter time period than is required for dissolving physical mixtures of crystal growth modifier and either of these phosphates.

Still further, we have made a significant and unexpected improvement in the art of crystallization.

We succeeded in forming new, large rod-shaped crystals having a hexagonal cross section and tubular passageway therein. These crystals have not been heretofore disclosed in the art. They are much larger than the needle-shaped crystals heretofore obtained and have a distinctive rod-shaped configuration and tubular passageway. Their large size enables chemists and customers to see, without a microscope, the nature and characteristics of the crystals and improves the free-flowing characteristics of the product. In the past, for example, elevated storage temperatures caused the water of hydration present at the surface of the crystals to evaporate, which made the crystals moist and sticky, and the later lowering of the temperature (e.g., overnight) caused the closely packed crystals to fuse together. This problem is largely overcome with the rod-shaped crystals because their large size prevents their being tightly packed together as are the smaller needle-shaped crystal phosphate heretofore obtained.

With respect to our new, thin needle-shaped crystals, the crystal growth modifier increases their rate of growth so that the crystals mature in a shorter period of time. These crystals have a hexagonal cross section and are brittle.

There are several factors that determine or influence whether the rod-shaped or needle-shaped crystals are produced. For example, the proportion of crystal growth modifier that is incorporated into the crystalline structure of both the hydrated trisodium phosphate and hydrated chlorinated trisodium phosphate determines or influences the shape and size of the crystals. In addition, we have found that the procedure by which the crystal growth modifier is added to the hot solution that yields the crystals, as well as the manner in which crystallization is conducted, determines or influences whether the rod-shaped or needle-shaped crystals are formed. If the hot solution, at about 65–100° C., is cooled undisturbed, rod-shaped crystals are formed. However, if the hot solution, at about 65–100° C., is agitated during cooling, needle-shaped crystals are formed.

We have found that there is no critical lower proportion of any one of the above-mentioned crystal growth modifiers that may be incorporated into either the hydrated trisodium phosphate crystals or hydrated chlorinated trisodium phosphate crystals. The upper proportion of crystal growth modifiers is important when the modifier is used with hydrated chlorinated trisodium phosphate in that too high a level of modifier tends to cause the crystals to be unstable.

We have found, for example, that we are able to obtain the large rod-shaped crystals, as well as the thin needle-shaped crystals, when the amount of any one of the above-mentioned crystal growth modifiers present in the crystals is at least about 0.001–0.03% by weight based on the weight of the modifier plus either the hydrated trisodium phosphate crystals or hydrated chlorinated trisodium phosphate crystals.

With respect to the maximum amount of any one of the above-mentioned crystal growth modifiers that may be included within either hydrated trisodium phosphate or hydrated chlorinated trisodium phosphate crystals to produce our rod-shaped crystals having a tubular passageway therein, we have found that satisfactory results were obtained with up to about 0.10% by weight of sodium lauryl sulfate and sodium N-methyl oleoyltaurate, and up to about 0.25% by weight sodium dodecyl benzene sulfonate, preferably up to about ½ these levels, wherein said percentages are based on the weight of the modifier(s) plus either the hydrated trisodium phosphate or hydrated chlorinated trisodium phosphate.

If one wishes to produce the needle-shaped crystals that include hydrated chlorinated trisodium phosphate and crystal growth modifier, the above lower proportions of crystal growth modifiers may be used, as well as proportions exceeding 0.25% by weight of sodium dodecyl benzene sulfonate or exceeding 0.10% by weight of either sodium lauryl sulfate or sodium N-methyl oleoyltaurate, by using the procedures disclosed in U.S. Patents 1,965,304 and 2,324,302, with the modification that the crystal growth modifiers should be preferably added to the di-tri-liquor immediately after the addition of the hypochlorite solution. The maximum level of crystal growth modifiers that may be incorporated into the discrete needle-shaped hydrated chlorinated trisodium phosphate crystals is essentially limited by the degree of stability desired or tolerated. It has been found that excessive quantities of crystal growth modifiers cause the available chlorine provided by the alkali metal hypochlorite present with the hydrated trisodium phosphate to rapidly dissipate and the crystalline phosphate-modifier product to possess poor chemical stability properties. We have found, for example, about 0.25% by weight sodium dodecyl benzene sulfonate or about 0.2% by weight of sodium lauryl sulfate or sodium N-methyl oleoyltaurate may be effectively included within the chlorinated trisodium phosphate crystals, whereas an amount greater than 0.5% by weight of sodium dodecyl benzene sulfonate or 0.3% by weight of sodium lauryl sulfate or sodium N-methyl oleoyltaurate causes the product to have comparatively poor stability properties and not to be suitable for most commercial purposes.

We have found, based upon tests, that crystals having both hydrated chlorinated trisodium phosphate and about 0.06% by weight sodium dodecyl benzene sulfonate or 0.04% by weight of either sodium lauryl sulfate or sodium N-methyl oleoyltaurate therein were as stable as chlorinated trisodium phosphate crystals without the modifier. These tests were made at room temperature (80° F.) over a period of about one month. The available chlorine of the crystals was found to vary from 3.85% to 3.80% by weight for sodium dodecyl benzene sulfonate, 3.83% to 3.78% by weight for sodium lauryl sulfate and 3.62% to 3.51% by weight for sodium N-methyl oleoyltaurate.

With respect to the discrete, needle-shaped hydrated trisodium phosphate containing crystals, there is no critical upper limit to the proportions of crystal growth modifiers that may be included within the crystals of the phosphate. About 4% by weight sodium dodecyl benzene sulfonate or even up to about 6% by weight of this modifier may be included in the crystalline structure of hydrated trisodium phosphate. On the other hand, about 1% by weight or even up to about 3% by weight of sodium lauryl sulfate or sodium N-methyl oleoyltaurate may be included in the crystalline structure of the hydrated trisodium phosphate crystals.

Our discrete rod-shaped crystals that include hydrated trisodium phosphate or hydrated chlorinated trisodium phosphate crystals plus crystal growth modifier(s) may be prepared having a length of about ⅜ to 2 inches, which length is about 8 to 12 times the diameter as measured across opposite flat sides. We have made, for example, crystals having lengths of about 1 inch and a diameter, as measured across opposite flat sides, of about ⅛ inch. These crystals have a continuous, tubular tapering passageway therein that extends along their entire longitudinal axes. The passageway is substantially conical or frusto-conical in shape and has a large or major diameter of about 1/32 inch at one end and a diameter of about 1/1000 inch at the opposite end. We have also prepared crystals 2 inches long having a passageway therein extending end to end, but also having small removable crystals within the passageway; these small crystals are formed by the crystallization of the solution within the passageway. The rod-shaped crystals may be as short as about ⅜ inch and have a diameter of about 1/32 inch as measured across opposite flat surfaces. The dimensions of the substantially conical passageway proportionally decreases with such smaller rod-shaped crystals.

On the other hand, our thin, brittle, needle-shaped crystals of hydrated trisodium phosphate and hydrated chlorinated trisodium phosphate with the crystal growth modifier(s) within the crystalline structure thereof may be prepared having substantially the same size as the corresponding needle-shaped hydrated phosphate without the modifier within the crystalline structure. These needle-shaped crystals may be about ¼ inch long and have a substantially smaller diameter, as measured across opposite flat sides of the hexagonal crystals, than the rod-shaped crystals.

The accompanying drawing shows various representations of new, hydrated, rod-shaped crystalline products we produced wherein (a) the products are thicker than the above referred to thin needle-shaped crystals, and (b) the crystals of these products have a continuous tapering passageway therein that extend from end to end. The passageways taper outwardly in the direction of crystal growth.

FIGURE 1 shows a cluster 20 of discrete crystals having therein hydrated chlorinated trisodium phosphate and crystal growth modifier(s). FIGURE 2 is an enlarged perspective view of one of the discrete rod-shaped particles 10 shown in FIGURE 1, and shows its hexagonal cross section and one end of the tapering tubular passageway 11 therein. FIGURE 3 is a cross sectional view of the crystal 10 shown in FIGURE 2, and shows the tapering or substantially frusto-conical passageway 11 therein extending from one end of the crystal to its other end. FIGURE 4 is an enlarged top view of the crystal 10 shown in FIGURE 3 taken along the line 4—4. The dimension $d$ shown in FIGURE 4 is the diameter (average diameter measured through the center) of the crystal as measured across opposite flat sides or surfaces $a$ and $b$ of the crystal. FIGURE 5 shows a special arrangement of some of the crystals shown in FIGURE 1, including the crystal 10. This arrangement shows that some of the crystals vary in length. FIGURE 6 is a cluster 40, similar to FIGURE 1, of discrete crystals having therein hydrated trisodium phosphate and crystal growth modifier(s). The cluster 40 includes crystals such as discrete crystal 30, and these crystals have a tapering tubular passageway therein. The rod-shaped crystals of FIGURE 1 are large than those of FIGURE 6, and both types of these crystals are larger or thicker than the needle-shaped crystals.

In two series of tests ("A" and "B" series), the time required for 10 grams of our dry needle-shaped crystalline material to dissolve in one liter of tap water at 80° F. was determined for crystalline products having within their crystalline structures crystal growth modifier(s) plus either hydrated chlorinated trisodium phosphate ("A" series of tests) or hydrated unchlorinated trisodium phosphate ("B" series of tests). In each of these two series of tests, the dissolution rates of these crystalline products were compared with the dissolution rates of physical mixtures of each of the hydrated phosphates plus modifier(s).

The results of test series "A" and "B" wherein (a) sodium dodecyl benzene sulfonate, (b) sodium lauryl sulfate, and (c) sodium N-methyl oleoyltaurate were used are shown below in Tables IA and IB, IIA and IIB, and IIIA and IIIB, respectively. Tables IA, IIA and IIIA refer to the "A" series of tests, whereas Tables IB, IIB and IIIB cover the "B" series of tests. The test results shown in these tables clearly indicate that the mechanically combined or physical mixtures dissolve more slowly than crystalline products prepared in accordance with our invention.

TABLE IA

| Weight Percent of Sodium Dodecyl Benzene Sulfonate Present in Samples | Time Required to Dissolve Measured in Seconds | |
|---|---|---|
| | Chlorinated Trisodium Phosphate Having Sodium Dodecyl Benzene Sulfonate Within the Crystalline Structure | Physical Mixture of Chlorinated Trisodium Phosphate and Sodium Dodecyl Benzene Sulfonate |
| 1/16 | 5 | 8 |
| 1/8 | 12 | 19 |
| 1/4 | 14 | 23 |
| 1/2 | 13 | 35 |
| 1 | 10 | 45 |

TABLE IB

| Weight Percent of Sodium Dodecyl Benzene Sulfonate Present in Samples | Time Required to Dissolve Measured in Seconds | |
|---|---|---|
| | Trisodium Phosphate Having Sodium Dodecyl Benzene Sulfonate Within the Crystalline Structure | Physical Mixture of Trisodium Phosphate and Sodium Dodecyl Benzene Sulfonate |
| 1/4 | 11 | 30 |
| 1/2 | 10 | 45 |
| 1 | 11 | 55 |

TABLE IIA

| Weight Percent of Sodium Lauryl Sulfate Present in Samples | Time Required to Dissolve Measured in Seconds | |
|---|---|---|
| | Chlorinated Trisodium Phosphate Having Sodium Lauryl Sulfate Within the Crystalline Structure | Physical Mixture of Chlorinated Trisodium Phosphate and Sodium Lauryl Sulfate |
| 0.0375 | 13 | 13 |
| 0.075 | 18 | 18 |
| 0.15 | 31 | 37 |
| 0.3 | 47 | 60 |

TABLE IIB

| Weight Percent of Sodium Lauryl Sulfate Present in Samples | Time Required to Dissolve Measured in Seconds | |
|---|---|---|
| | Trisodium Phosphate Having Sodium Lauryl Sulfate Within the Crystalline Structure | Physical Mixture of Trisodium Phosphate and Sodium Lauryl Sulfate |
| 0.0375 | 10 | 35 |
| 0.075 | 12 | 37 |
| .15 | 13 | 48 |
| 0.3 | 10 | 50 |

TABLE IIIA

| Weight Percent of Sodium N-Methyl Oleoyltaurate | Time Required to Dissolve Measured in Seconds | |
|---|---|---|
| | Chlorinated Trisodium Phosphate Having Sodium N-Methyl Oleoyltaurate Within the Crystalline Structure | Physical Mixture of Chlorinated Trisodium Phosphate and Sodium N-Methyl Oleoyltaurate |
| 0.0375 | 6 | 30 |
| 0.075 | 10 | 50 |
| 0.15 | 8 | 105 |
| 0.30 | 10 | 150 |

TABLE IIIB

| Weight Percent of Sodium N-Methyl Oleoyltaurate | Time Required to Dissolve Measured in Seconds | |
|---|---|---|
| | Trisodium Phosphate Having Sodium N-Methyl Oleoyltaurate Within the Crystalline Structure | Physical Mixture of Trisodium Phosphate and Sodium N-Methyl Oleoyltaurate |
| 0.0375 | 15 | 35 |
| 0.075 | 14 | 37 |
| 0.15 | 16 | 48 |
| 0.30 | 16 | 50 |

Tests were also conducted to determine the stability of the crystal growth modifiers. Separate solutions containing 1% by weight of each of the modifiers plus 3.5% by weight available chlorine were heated to 65° C. for three hours. The modifiers were carefully separated from their respective solutions and were purified. Samples of the crystal growth modifiers not treated with sodium hypochlorite solution were also purified. Infra red spectrorams were prepared of the treated and untreated purified modifiers. The spectrograms of each of treated and untreated samples of sodium dodecyl benzene sulfonate, sodium lauryl sulfate, and sodium N-methyl oleoyltaurate indicated that the bulk of each of the modifiers remained unaffected by being treated in hypochlorite solution.

Tests were made with the products listed below to determine if they would modify either the rate of growth or size and shape of hydrated chlorinated trisodium phosphate crystals, but such modifications did not result:

(1) Sulfated nonylphenoxypoly(ethyleneoxy)ethanol wherein there are 4 ethyleneoxy groups;
(2) Sodium tetrahydronaphthalene sulfonate;
(3) Sodium dodecyldiphenyl oxide disulfonate;
(4) Sodium N-cyclohexyl-N-palmitoyl-taurate;
(5) Sodium xylene sulfonate;
(6) Sodium sulfated tridecanol ethoxylate;
(7) Sodium dibutyl naphthalene sulfonate; and
(8) Sodium-2-ethyl hexyl sulfate.

On the other hand, such crystal modifications were obtained with sodium dodecyl benzene sulfonate, sodium lauryl sulfate and sodium N-methyl oleoyltaurate.

In conducting these tests, 44 grams of anhydrous disodium phosphate and 9.5 grams of sodium hydroxide were dissolved in 200 ml. of tap water. The solution was heated to about 65° C. or more. Seventy-two and four-tenths grams of a sodium hypochlorite solution having 15% available chlorine were added to and thoroughly mixed with the solution. Seven-hundredth gram (1/16%) of the above-mentioned organic wetting agents were added to and thoroughly mixed with separate solutions made in this manner. In each instance, the resulting solutions were covered and set aside to crystallize undisturbed. After approximately 12 to 24 hours elapsed, the crystals produced from these solutions attained their maximum size. The remaining mother liquor from each test was then decanted from the crystals and the crystals were allowed to dry. Other concentrations of the same products were also tested (i.e., ⅛% by weight, ¼% by weight, ½% by weight).

In producing our stable, water-soluble crystalline products consisting essentially of crystals of hydrated unchlorinated trisodium phosphate having crystal growth modifier(s) within the crystalline structure, trisodium phosphate is dissolved in water to form a crystallizable liquor, and hydrated phosphate crystals having the modifier(s) therein are recovered from the liquor. We prefer to dissolve in the crystallizable liquor at least about 0.001–0.03% by weight of crystal growth modifier(s) or acid form thereof and heat the liquor to about 65–100° C. The resulting liquor is crystallized to form stable, water-soluble elongated crystals consisting essentially of crystals of hydrated trisodium phosphate having a minor, crystal growth modifying amount of said modifier(s) present within the crystalline structure. It is desirable to add more water to the crystallizable liquor than is present in the crystallizable product to compensate for loss of water from evaporation during crystallization. To form needle-shaped crystals, the crystallizable liquor must be agitated during crystallization, whereas the liquor must remain undisturbed or not agitated during crystallization to form rod-shaped crystals.

In producing our stable, water-soluble crystalline products consisting essentially of crystals of hydrated chlorinated trisodium phosphate having crystal growth modifier(s) within the crystalline structure, disodium phosphate, a strong caustic solution, and a strong alkali metal hypochlorite solution are mixed into solution to form a crystallizable liquor, and hydrated phosphate crystals having the modifier(s) therein are recovered from the liquor. We prefer to dissolve in the crystallizable liquor at least about 0.001–0.03% by weight of crystal growth modifier(s) or acid form thereof and heat the liquor to about 65–100° C. The resulting liquor is crystallized to form stable, water-soluble elongated crystals consisting essentially of hydrated chlorinated trisodium phosphate having a minor, crystal growth modifying amount of the modifier(s) present within the crystalline structure. It is desirable to add more water to the crystallizable liquor than is present in the crystallizable product to compensate for loss of water from evaporation during crystallization. To form needle-shaped crystals, the crystallizable liquor must be agitated during crystallization. The rod-shaped crystals are formed by not disturbing crystallization of the liquor with agitation.

More specifically, one may prepare our new rod-shaped hydrated crystalline products containing both hydrated unchlorinated trisodium phosphate and crystal growth modifier(s) within the same discrete crystals, by first adding anhydrous trisodium phosphate to a tank. Hot tap water is then added to the tank, and the mixture is heated to about 65–100° C. by means of a steam coil. Enough tap water is added to bring the Baumé gravity strength of the solution to about 20–30° Bé. (e.g., 21.1° Bé.) when the solution is at 65° C. A selected amount (e.g., about 0.001–0.25% by weight of sodium dodecyl benzent sulfonate or dodecyl benzene sulfonic acid, or about 0.001–0.10% by weight of sodium lauryl sulfate, or lauryl sulfuric acid ester, or sodium N-methyl oleoyltaurate, or N-methyl oleoyltaurine) of crystal growth modifier(s) is then added, and the solution is mixed thoroughly to assure that all the modifier goes into solution. If desired, the modifier may be added before the adjustment of the Baumé gravity. The resulting solution is then allowed to crystalline undisturbed. After 24 hours, the mother liquor may be drained and the crystals recovered. The resulting crystals include crystals that are in the shape of large, thick hexagonal rods having a continuous, tubular tapering passageway extending from end to end.

In order to produce our new rod-shaped, hydrated crystalline product wherein crystal growth modifier(s) is present within the hydrated chlorinated trisodium phosphate crystals, for example, disodium phosphate, such as anhydrous disodium phosphate, and a highly caustic solution are mixed in a tank. These ingredients are dissolved with hot tap water by means of steam coils to assure that all of the ingredients are in solution. A strong sodium hypochlorite solution having 15% available chlorine is rapidly added to the mixture of molten phosphate to provide a solution having about 2.1–3.5% by weight of available chlorine. The Baumé gravity strength is adjusted to about 25–30° Bé. (e.g., 26.2° Bé.) when the solution is at 65° C. After the solution has been heated to about 65–100° C. and the Baumé gravity has been adjusted, a small quantity of modifier is added and the solution is stirred thoroughly to assure that all of the modifier is dissolved. This solution is then allowed to cool undisturbed. After 24 hours, the mother liquor is drained. The resulting crystals include hydrated crystals that are in the shape of large, thick hexagonal rods which contain a continuous, tubular tapering passageway that extends throughout the length of the crystals. It is important to add the modifier either before, with, or immediately after the addition of the hypochlorite solution. One may add, for example, about 0.001–0.25% by weight of sodium dodecyl benzene sulfonate or dodecyl benzene sulfonic acid, or about 0.10% by weight of sodium lauryl sulfate, or lauryl sulfuric acid ester, or sodium N-methyl oleoyltaurate, or N-methyl oleoyltaurine. If it is desired to produce pink colored crystals, a potassium permanganate solution may be added to the hot liquid mixture prior to crystallization and thereby incorporated into the crystals.

More specifically, needle-shaped hydrated crystals containing hydrated unchlorinated trisodium phosphate and crystal growth modifier(s) may be prepared by agitating the solution during crystallization. In addition, needle-shaped crystals may be produced without a resulting mother liquor; this modification is particularly well suited for preparing needle-shaped crystals having a high proportion of modifier. This modified procedure, for example, may be carried out by melting commercial trisodium phosphate dodecahydrate together with a small amount of water (e.g., 8% by weight). The molten liquid should then be heated to about 90–104° C. At this temperature, a selected amount (e.g., about 0.001–6% by weight of sodium dodecyl benzene sulfonate, or dodecyl benzene sulfonic acid, or about 0.001–3% by weight of sodium lauryl sulfate, or lauryl sulfuric acid ester, or sodium N-methyl oleoyltaurate, or N-methyl oleoyltaurine) of modifier should be added and mixed thoroughly. The solution should then be allowed to cool with constant stirring. The resulting crystalline mass will have needle-shaped crystals that contain hydrated trisodium phosphate and the modifier within the crystalline structure, and requires very little further drying to remove unbound water.

Needle-shaped crystals containing hydrated chlorinated trisodium phosphate and crystal growth modifier(s) may be prepared by permitting crystals to be formed while agitating the solution during cooling. In addition, needle-shaped crystals may be formed, with or without permanganate, by using the procedures discussed in U.S. Patents 1,965,304 and 2,324,302, with the modification that the modifier is added immediately following the addition of the hypochlorite solution to the di-tri-liquor. One may add, for example, about 0.001–0.5% by weight of sodium dodcyl benzene sulfonate or dodecyl benzene sulfonic acid, or about 0.001–0.3% by weight of sodium lauryl sulfate or lauryl sulfuric acid ester, or sodium N-methyl oleolytaurate, or N-methyl oleoyltaurine.

In the following illustrative examples, Example I shows a method for preparing a hydrated crystalline product having both sodium dodecyl benzene sulfonate and hydrated chlorinated trisodium phosphate within the individual crystals. Examples II and III show methods for preparing hydrated crystalline products having both sodium dodecyl benzene sulfonate and hydrated trisodium phosphate within the individual crystals. Example IV illustrates one of the tests that were conducted to show that sodium dodecyl benzene sulfonate is present in the hydrated phosphate crystals. The crystalline products produced in each of Examples I and II were in the form of rod-shaped crystals, whereas the crystals produced in Example III were needle-shaped crystals.

*Example I*

A solution of chlorinated trisodium orthophosphate was prepared having the following proportions of constituents:

|  | Gms. |
|---|---|
| $Na_2HPO_4$ | 44.0 |
| NaOH | 9.5 |
| Sodium hypochlorite solution having 15% available chlorine and 3% NaOH | 72.5 |
| Hot water | 206.0 |
|  | 332.0 |

The above solution was heated to 65° C. Then, 0.07 gram of dodecyl benzene sulfonic acid was added, and the admixture was stirred to form a solution in which all of the modifier was dissolved. The solution was set aside to cool undisturbed.

In two hours, a crop of crystals began to form. The solution was left standing for 24 hours to assure complete growth of the crystals. At the end of this time, some of the crystals had grown to one inch in length and had a diameter of ⅛ inch as measured across the flat surfaces. These crystals were in the form of hexagonal prisms.

The crystals were allowed to dry for 24 hours and then were observed under a microscope. The crystals were found to have continuous, tubular tapering passageways extending from end to end. The crystals were larger in size than hydrated chlorinated trisodium phosphate crystals prepared by a similar process that excluded the addition of the modifier.

*Example II*

104 grams of alkaline, hydrated trisodium phosphate, were dissolved in 200 ml. of water by heating the admixture to 65° C. 0.06 gram of dodecyl benzene sulfonic acid was mixed into the hot solution until it completely dissolved. The solution was set aside to cool undisturbed.

After 3 hours, a crop of crystals began to form. After 24 hours, the crystals grew to their minimum length. These crystals were in the form of hexagonal rods having a tubular passageway extending end to end, and were larger in size than hydrated trisodium phosphate crystals that were prepared by a similar process that excluded the addition of the modifier.

*Example III*

Needle-shaped crystals having hydrated trisodium phosphate and sodium dodecyl benzene sulfonate within the crystalline structure were prepared by, first, placing 4,000 grams of alkaline trisodium phosphate dodecahydrate into a stainless steel kettle. Just enough water, namely 320 grams of tap water, were then added to the phosphate to provide water of crystallization for the resulting product. The mixture was then heated to 104° C., thereby causing the mixture to boil. 40 grams of sodium dodecyl benzene sulfonate were added to and mixed with the boiling solution. After the modifier completely dissolved, heating was discontinued and the melt was agitated while cooling to room temperature. Because only enough water is present as is required to provide the water of crystallization for the trisodium phosphate dodecahydrate, no mother liquor remained and the product thus had no free liquid to be removed. (Normally, a slight excess, 5% to 8%, of water is added to take care of evaporation losses during crystallization.) The surfaces of the crystals were, however, slightly moist and were air dried sufficiently to remove this moisture.

*Example IV*

In order to show that the wetting agent is included within the hydrated crystalline structure of both trisodium phosphate and chlorinated trisodium phosphate, qualitative tests were conducted.

The crystals of both the chlorinated and unchlorinated trisodium phosphate crystals having the modifier therein were washed five times with ether to assure complete removal of sodium dodecyl benzene sulfonate from the surface of the crystals. The crystals were then dissolved in distilled water and the solution was acidified with dilute sulfuric acid and boiled to remove the hypochlorous acid. This solution was then mixed with a methylene blue solution and extracted with chloroform. The chloroform layer turned blue, indicating that a methylene blue dodecyl benzene sulfonate salt was formed. This test shows that the modifier is present within the crystal structure and not on the surface of the crystals.

If the solutions that yield the crystals produced in Examples I and II, above, were agitated during cooling, needle-shaped crystals would be formed.

In the following illustrative examples, Example V shows a method for preparing a hydrated crystalline product having both sodium lauryl sulfate and hydrated chlorinated trisodium phosphate within the individual crystals. Examples VI and VII show methods for preparing hydrated crystalline products having both sodium lauryl sulfate and hydrated trisodium phosphate within the individual crystals. Example VIII is one of the tests that were conducted to show that the sodium lauryl sulfate is present in the hydrated phosphate crystals. The crystalline products produced in each of Examples V and VI were in the form of rod-shaped crystals, whereas the crystals produced in Example VII were needle-shaped crystals.

*Example V*

A solution of chlorinated trisodium orthophosphate was prepared having the following proportions of constituents:

|  | Gms. |
|---|---|
| $Na_2HPO_4$ | 44.0 |
| NaOH | 9.5 |
| Sodium hypochlorite solution having 15% available chlorine and 3% NaOH | 72.5 |
| Hot water | 206.0 |
|  | 332.0 |

The above solution was heated to 65° C. Then, 0.09 gram of a 30% solution of sodium lauryl sulfate was added, and the admixture was stirred to form a solution in which all of the modifier was dissolved. The solution was set aside to cool undisturbed.

In two hours, a crop of crystals began to form. The solution was left standing for 24 hours to assure complete growth of the crystals. As the end of this time, some of the crystals had grown to one inch in length and had a diameter of ⅛ inch as measured across the flat surfaces. These crystals were in the form of hexagonal prisms.

The crystals were allowed to dry for 24 hours and then were observed under a microscope. The crystals were found to have continuous, tubular tapering passageways extending from end to end. The crystals were larger in size than hydrated chlorinated trisodium phosphate crystals prepared by a similar process that excluded the addition of the modifier.

*Example VI*

104 grams of alkaline hydrated trisodium phosphate were dissolved in 200 ml. of water by heating the admixture to 65° C. 0.09 gram of a 30% solution of sodium lauryl sulfate was mixed into the hot solution until it completely dissolved. The solution was set aside to cool undisturbed.

After 3 hours, a crop of crystals began to form. After 24 hours, the crystals grew to their maximum length. These crystals were in the form of hexagonal rods having a tubular passageway extending end to end, and were larger in size than hydrated trisodium phosphate crystals that were prepared by a similar process that excluded the addition of the modifier.

*Example VII*

Needle-shaped crystals having hydrated trisodium phosphate and sodium lauryl sulfate within the crystalline structure were prepared by, first, placing 4,000 grams of alkaline trisodium phosphate dodecahydrate into a stainless steel kettle. Just enough water, namely 320 grams of tap water, were then added to the phosphate to provide water of crystallization for the resulting product. The mixture was then heated to 104° C., thereby causing the mixture to boil. 40 grams of sodium lauryl sulfate were added to and mixed with the boiling solution. After the modifier completely dissolved, heating was discontinued and the melt was agitated while cooling to room temperature. Because only enough water is present as is required to provide the water of crystallization for the trisodium phosphate dodecahydrate, no mother liquor remained and the product thus had no free liquid to be removed. (Normally, a slight excess, 5% to 8%, of water is added to take care of evaporation losses during crystallization.) The surfaces of the crystals were, however, slightly moist and were air dried sufficiently to remove this moisture.

*Example VIII*

In order to show that the wetting agent is included within the hydrated crystalline structure of both trisodium phosphate and chlorinated trisodium phosphate, qualitative tests were conducted.

The crystals of both the chlorinated and unchlorinated trisodium phosphate crystals having the modifier therein were washed five times with ethanol to assure complete removal of sodium lauryl sulfate from the surface of the crystals. The crystals were then dissolved in distilled water and the solution was acidified with dilute sulfuric acid and boiled to remove the hypochlorous acid. This solution was then mixed with a methylene blue solution and extracted with chloroform. The chloroform layer turned blue, indicating that a methylene blue lauryl sulfate salt was formed. This test shows that the modifier is present within the crystal structure.

If the solutions that yield the crystals produced in Examples V and VI, above, were agitated during cooling, needle-shaped crystals would be formed.

In the following illustrative examples, Example IX shows a method for preparing a hydrated crystalline product having both sodium N-methyl oleoyltaurate and hydrated chlorinated trisodium phosphate within the individual crystals. Examples X and XI show methods for preparing hydrated crystalline products having both sodium N-methyl oleoyltaurate and hydrated trisodium phosphate within the individual crystals. The crystalline products produced in each of Examples IX and X were in the form of rod-shaped crystals, whereas the crystals produced in Example XI were needle-shaped crystals.

*Example IX*

A solution of chlorinated trisodium phosphate was prepared having the following proportions of constituents:

| | Gms. |
|---|---|
| Na$_2$HPO$_4$ | 44.0 |
| NaOH | 9.5 |
| Sodium hypochlorite solution having 15% available chlorine and 3% NaOH | 72.5 |
| Hot Water | 206.0 |
| | 332.0 |

The above solution was heated to 65° C. Then, 0.09 gram of a 33% solution of sodium N-methyl oleoyl-taurate was added, and the admixture was stirred to form a solution in which all of the modifier was dissolved. The solution was set aside to cool undisturbed.

In two hours, a crop of crystals began to form. The solution was left standing for 24 hours to assure complete growth of the crystals. At the end of this time, some of the crystals had grown to one inch in length and had a diameter of ⅛ inch as measured across the flat surfaces. These crystals were in the form of hexagonal prisms.

The crystals were allowed to dry for 24 hours and then were observed under a microscope. The crystals were found to have continuous, tubular tapering passageways extending from end to end. The crystals were larger in size than hydrated chlorinated trisodium phosphate crystals prepared by a similar process that excluded the addition of the modifier.

*Example X*

104 grams of alkaline hydrated trisodium phosphate were dissolved in 200 ml. of water by heating the admixture to 65° C. 0.09 gram of a 33% solution of sodium N-methyl oleoyltaurate was mixed into the hot solution until it completely dissolved. The solution was set aside to cool undisturbed.

After 3 hours, a crop of crystals began to form. After 24 hours, the crystals grew to their maximum length. These crystals were in the form of hexagonal rods having a tubular passageway extending end to end, and were larger in size than hydrated trisodium phosphate crystals that were prepared by a similar process that excluded the addition of the modifier.

*Example XI*

Needle-shaped crystals having hydrated trisodium phosphate and sodium N-methyl oleoyltaurate within the crystalline structure were prepared by, first, placing 4,000 grams of alkaline trisodium phosphate dodecahydrate into a stainless steel kettle. Just enough water, namely 320 grams of tap water, were then added to the phosphate to provide water of crystallization for the resulting product. (Normally, a slight excess, 5% to 8%, of water is added to take care of evaporation losses during crystallization.) The mixture was then heated to 104° C., thereby causing the mixture to boil. 40 grams of sodium N-methyl oleoyltaurate were added to and mixed with the boiling solution. After the modifier completely dissolved, heating was discontinued and the melt was agitated while cooling to room temperature. Because only enough water is present as is required to provide the water of crystallization for the trisodium phospate dodecahydrate, no mother liquor remained and the product thus had no free liquid to be removed. The surfaces of the crystals were, however, slightly moist and were air dried sufficiently to remove this moisture.

If the solutions that yield the crystals produced in Examples IX and X, above, were agitated during cooling, needle-shaped crystals would be formed.

All of the foregoing Baumé gravity readings or values, including those mentioned in the foregoing descriptive portions of the application as well as the enumerated specific examples, are based upon the use of a Baumé hydrometer that is calibrated to read at 60° F.

The term "hydrated trisodium phosphate" in the following claims is intended to include both the chlorinated and unchlorinated forms.

The foregoing detailed description has been given for clearness of understanding only, and no unnecessary limitations should be understood therefrom, as modifications will be obvious to those skilled in the art.

We claim:

1. Stable, water-soluble, hydrated thin needle-shaped crystals having a hexagonal cross section consisting essentially of crystals of hydrated chlorinated trisodium phosphate having, within the crystalline structure of said crystals, a crystal growth modifier of the group consisting of at least about 0.001% by weight and not more than about 0.5% by weight sodium dodecyl benzene sulfonate, at least about 0.001% by weight and not more than about 0.3% by weight of sodium lauryl sulfate, and at least about 0.001% by weight and not more than about 0.3% by weight of sodium N-methyl oleoyltaurate.

2. The produce of claim 1 wherein said modifier is at least about 0.001% by weight and not more than about 0.5% by weight of sodium dodecyl benzene sulfonate.

3. The product of claim 1 wherein said modifier is at least about 0.001% by weight and not more than about 0.3% by weight of sodium lauryl sulfate.

4. The product of claim 1 wherein said modifier is at least about 0.001% by weight and not more than about 0.3% by weight of sodium N-methyl oleoyltaurate.

5. The product of claim 1 wherein said crystals have an alkali metal permanganate present within the crystalline structure thereof in an amount up to about 8% of the chlorinated trisodium phosphate.

6. Stable, water-soluble, hydrated thin needle-shaped crystals having a hexagonal cross section consisting essentially of crystals of hydrated unchlorinated trisodium phosphate having, within the crystalline structure of said crystals, a crystal growth modifier of the group consisting of at least about 0.001% by weight and not more than about 6% by weight sodium dodecyl benzene sulfonate, at least about 0.001% by weight and not more than about 3% by weight of sodium lauryl sulfate, and at least about 0.001% by weight and not more than about 3% by weight of sodium N-methyl oleoyltaurate.

7. The product of claim 6 wherein said modifier is at least about 0.001% by weight and not more than about 6% by weight of sodium dodecyl benzene sulfonate.

8. The product of claim 6 wherein said modifier is at least about 0.001% by weight and not more than about 3% by weight of sodium lauryl sulfate.

9. The product of claim 6 wherein said modifier is at least about 0.001% by weight and not more than about 3% by weight of sodium N-methyl oleoyltaurate.

10. Stable, water-soluble, hydrated, large rod-shaped crystals having a hexagonal cross section, a longitudinally extending open passageway therein, and a length of about 3/8–2 in. and about 8–12 times the diameter as measured across opposite flat sides thereof, said crystals consisting essentially of crystals of a member of the group consisting of hydrated chlorinated trisodium phosphate and hydrated unchlorinated trisodium phosphate, and having, within the crystalline structure of said crystals, a crystal growth modifier of the group consisting of at least about 0.001% by weight and not more than about 0.25% by weight of sodium dodecyl benzene sulfonate, at least about 0.001% by weight and not more than about 0.10% by weight of sodium lauryl sulfate, and at least about 0.001% by weight and not more than about 0.10% by weight of sodium N-methyl oleoyltaurate.

11. Stable, water-soluble, hydrated, large rod-shaped crystals having a hexagonal cross section, a longitudinally extending open passageway therein, and a length of about 3/8 to 2 in., said crystals consisting essentially of crystals of a member of the group consisting of hydrated chlorinated trisodium phosphate and hydrated unchlorinated trisodium phosphate, and having, within the crystalline structure of said crystals, a crystal growth modifier of the group consisting of at least about 0.001% by weight and not more than about 0.25% by weight of sodium dodecyl benzene sulfonate, at least about 0.001% by weight and not more than about 0.10% by weight of sodium lauryl sulfate, and at least about 0.001% by weight and not more than about 0.10% by weight of sodium N-methyl oleoyltaurate.

12. The product of claim 11 wherein said modifier is at least about 0.001% by weight and not more than about 0.25% by weight of sodium dodecyl benzene sulfonate.

13. The product of claim 11 wherein said modifier is at least about 0.001% by weight and not more than about 0.10 by weight of sodium lauryl sulfate.

14. The product of claim 11 wherein said modifier is at least about 0.001% by weight and not more than about 0.10% by weight of sodium N-methyl oleoyltaurate.

15. In the method of producing stable, water-soluble hydrated crystals consisting essentially of hydrated chlorinated trisodium phosphate having crystal growth modifier of the group consisting of sodium dodecyl benzene sulfonate, sodium lauryl sulfate, and sodium N-methyl oleoyltaurate present within the crystalline structure, wherein disodium phosphate, a strong caustic solution, and a strong alkali metal hypochlorite solution are mixed into solution to form a crystallizable liquor, and hydrated phosphate crystals are recovered from the liquor, the improvement being dissolving in the crystallizable liquor a growth modifying amount of a member of the group consisting of about 0.001–0.5% by weight of sodium dodecyl benzene sulfonate, about 0.001–0.3% by weight of sodium lauryl sulfate, about 0.001–0.3% by weight of sodium N-methyl oleoyltaurate, and about the same amounts of an acid form of any of said members, and then crystallizing the resulting liquor to form stable, water-soluble elongated crystals consisting essentially of hydrated chlorinated trisodium phosphate having said modifier present within the crystalline structure.

16. The method of claim 15 wherein more water is added to the crystallizable liquor than is present in the crystalline product to compensate for loss of water from evaporation during crystallization and the crystallizable liquor is heated to about 65–100° C. prior to crystallization.

17. The method of claim 15 wherein said crystallizable liquor is agitated and heated to about 65–100° C. prior to crystallization and agitated during crystallization, to form at an increase rate of growth thin needle-shaped crystals having a hexagonal cross section.

18. The method of claim 15 wherein sufficient amount of said member is dissolved in the liquor prior to crystallization to form at an increased of growth thin needle-shaped crystals, more water is added to the crystallizable liquor than is present in the crystalline product to compensate for loss of water from evaporation during crystallization, and the crystallizable liquor is heated to about 65–100° C. prior to crystallization.

19. In the method of producing stable, water-soluble hydrated crystals consisting essentially of hydrated chlorinated trisodium phosphate having crystal growth modifier of the group consisting of sodium dodecyl benzene sulfonate, sodium lauryl sulfate, and sodium N-methyl oleoyltaurate present within the crystalline structure, wherein disodium phosphate, a strong caustic solution, and a strong alkali metal hypochlorite solution are mixed into solution to form a crystallizable liquor, and hydrated phosphate crystals are recovered from the liquor, the improvement being dissolving in the crystallizable liquor a crystal growth modifying amount of a member of the group consisting of about 0.001–0.25% by weight of sodium dodecyl benzene sulfonate, about 0.001–0.10% by weight of sodium lauryl sulfate, about 0.001–0.10% by weight of sodium N-methyl oleoyltaurate, and about the same amounts of an acid form of any of said members, and then crystallizing the resulting liquor to form stable, water-soluble elongated crystals consisting essentially of hydrated chlorinated trisodium phosphate having said modifier present within the crystalline structure.

20. The method of claim 19 wherein more water is added to the crystallizable liquor than is present in the crystalline product to compensate for loss of water from evaporation during crystallization and the crystallizable liquor is heated to about 65–100° C. prior to crystallization.

21. The method of claim 19 wherein the crystallizable liquor is heated to about 65–100° C. prior to crystallization and is undisturbed during crystallization to form large rod-shaped crystals having a hexagonal cross section and an elongated tubular passageway therein.

22. The method of claim 19 wherein sufficient amount of said member is dissolved in the liquor prior to crystallization to form large rod-shaped crystals, more water is added to the crystallizable liquor than is present in the crystalline product to compensate for loss of water from evaporation during crystallization, and the crystallizable liquor is heated to about 65–100° C. prior to crystallization.

23. In the method of producing stable, water-soluble hydrated crystals consisting essentially of hydrated unchlorinated trisodium phosphate having crystal growth modifier of the group consisting of sodium dedecyl benzene sulfonate, sodium lauryl sulfate, and sodium N-methyl oleoyltaurate present within the crystalline structure, wherein trisodium phosphate is dissolved in water to form a crystallizable liquor, and hydrated phosphate crystals are recovered from the liquor, the improvement being dissolving in the crystallizable liquor a crystal growth modifying amount of a member of the group consisting of about 0.001–6% by weight of sodium dodecyl benzene sulfonate, about 0.001–3% by weight of sodium lauryl sulfate, about 0.001–3% by weight of sodium N-methyl oleoyltaurate, and about the same amounts of an acid form of any of said members, and then crystallizing the resulting liquor to form stable, water-soluble elongated crystals consisting essentially of crystals of hydrated trisodium phosphate having said modifier present within the crystalline structure.

24. The method of claim 23 wherein more water is added to the crystallizable liquor than is present in the crystalline product to compensate for loss of water from evaporation during crystallization and the crystallizable liquor is heated to about 65–100° C. prior to crystallization.

25. The method of claim 23 wherein said crystallizable liquor is agitated and heated to about 65–100° C. prior to crystallization and agitated during crystallization to form at an increased rate of growth thin needle-shaped crystals having a hexagonal cross section.

26. The method of claim 23 wherein sufficient amount of said member is dissolved in the liquor prior to crystallization to form at an increased rate of growth thin needle-shaped crystals, more water is added to the crystallizable liquor than is present in the crystalline product to compensate for loss of water from evaporation during crystallization, and the crystallizable liquor is heated to about 65–100° C. prior to crystallization.

27. In the method of producing stable, water-soluble hydrated crystals consisting essentially of hydrated unchlorinated trisodium phosphate having crystal growth modifier of the group consisting of sodium dodecyl benzene sulfonate, sodium lauryl sulfate, and sodium N-methyl oleoyltaurate present within the crystalline structure, wherein trisodium phosphate is dissolved in water to form a crystallizable liquor, and hydrated phosphate crystals are recovered from the liquor, the improvement being dissolving in the crystallizable liquor a crystal growth modifying amount of a member of the group consisting of about 0.001–0.25% by weight of sodium dodecyl benzene sulfonate, about 0.001–0.10% by weight of sodium lauryl sulfate, about 0.001–0.10% by weight of N-methyl oleoyltaurate, and about the same amounts of an acid form of any of said members, and then crystallizing the resulting liquor to form stable, water-soluble elongated crystals consisting essentially of crystals of hydrated trisodium phosphate having said modifier present within the crystalline structure.

28. The method of claim 27 wherein more water is added to the crystallizable liquor than is present in the crystalline product to compensate for loss of water from evaporation during crystallization and the crystallizable liquor is heated to about 65–100° C. prior to crystallization.

29. The method of claim 27 wherein the crystallizable liquor is heated to about 65–100° C. prior to crystallization and is undisturbed during crystallization to form large rod-shaped crystals having a hexagonal cross section and an elongated tubular passageway therein.

30. The method of claim 27 wherein sufficient amount of said member is dissolved in the liquor prior to crystallization to form large rod-shaped crystals, more water is added to the crystallizable liquor than is present in the crystalline product to compensate for loss of water from evaporation during crystallization, and the crystallizable liquor is heated to about 65–100° C. prior to crystallization.

References Cited by the Examiner

UNITED STATES PATENTS

| 1,555,474 | 9/1925 | Mathias | 252—99 |
| 1,885,905 | 11/1932 | Frost | 252—109 |
| 1,965,304 | 7/1934 | Adler | 252—99 XR |
| 2,050,249 | 8/1936 | Adler | 23—107 |
| 2,324,302 | 7/1943 | Hull | 252—99 |
| 2,524,394 | 10/1950 | Madorsky | 252—99 XR |
| 2,791,562 | 5/1957 | Diffley | 252—137 XR |
| 2,927,081 | 3/1960 | Schramm | 252—137 |

FOREIGN PATENTS 164,813    8/1955    Australia.

LEON D. ROSDOL, *Primary Examiner.*

ALBERT T. MEYERS, JULIUS GREENWALD,
*Examiners.*